United States Patent [19]

van Mil

[11] Patent Number: 4,510,886

[45] Date of Patent: Apr. 16, 1985

[54] DEVICE FOR EMPTYING A CONTAINER FILLED WITH LIVE POULTRY

[75] Inventor: Martinus P. G. van Mil, Boxmeer, Netherlands

[73] Assignee: Stork PMT B.V., Netherlands

[21] Appl. No.: 598,816

[22] Filed: Apr. 10, 1984

[30] Foreign Application Priority Data

Apr. 18, 1983 [NL] Netherlands .................. 8301348

[51] Int. Cl.³ ............................................ A01K 31/07
[52] U.S. Cl. ..................................................... 119/82
[58] Field of Search ................ 119/82, 17; 414/421, 414/371; 193/21, 22, 23

[56] References Cited

U.S. PATENT DOCUMENTS

| 1,700,944 | 2/1929 | Loew | 414/421 X |
| 2,071,771 | 2/1937 | Shield | 193/21 X |
| 3,741,417 | 6/1973 | Blankenship | 119/82 X |
| 4,380,969 | 4/1983 | Thomas | 119/82 |

Primary Examiner—Hugh R. Chamblee
Attorney, Agent, or Firm—Newton, Hopkins & Ormsby

[57] ABSTRACT

Device for depositing live poultry on to a receiving surface from a container having a plurality of floors, via guide surfaces enclosed in a pivotable chute to adjoin the container and having an increasing length from bottom to top.

4 Claims, 2 Drawing Figures

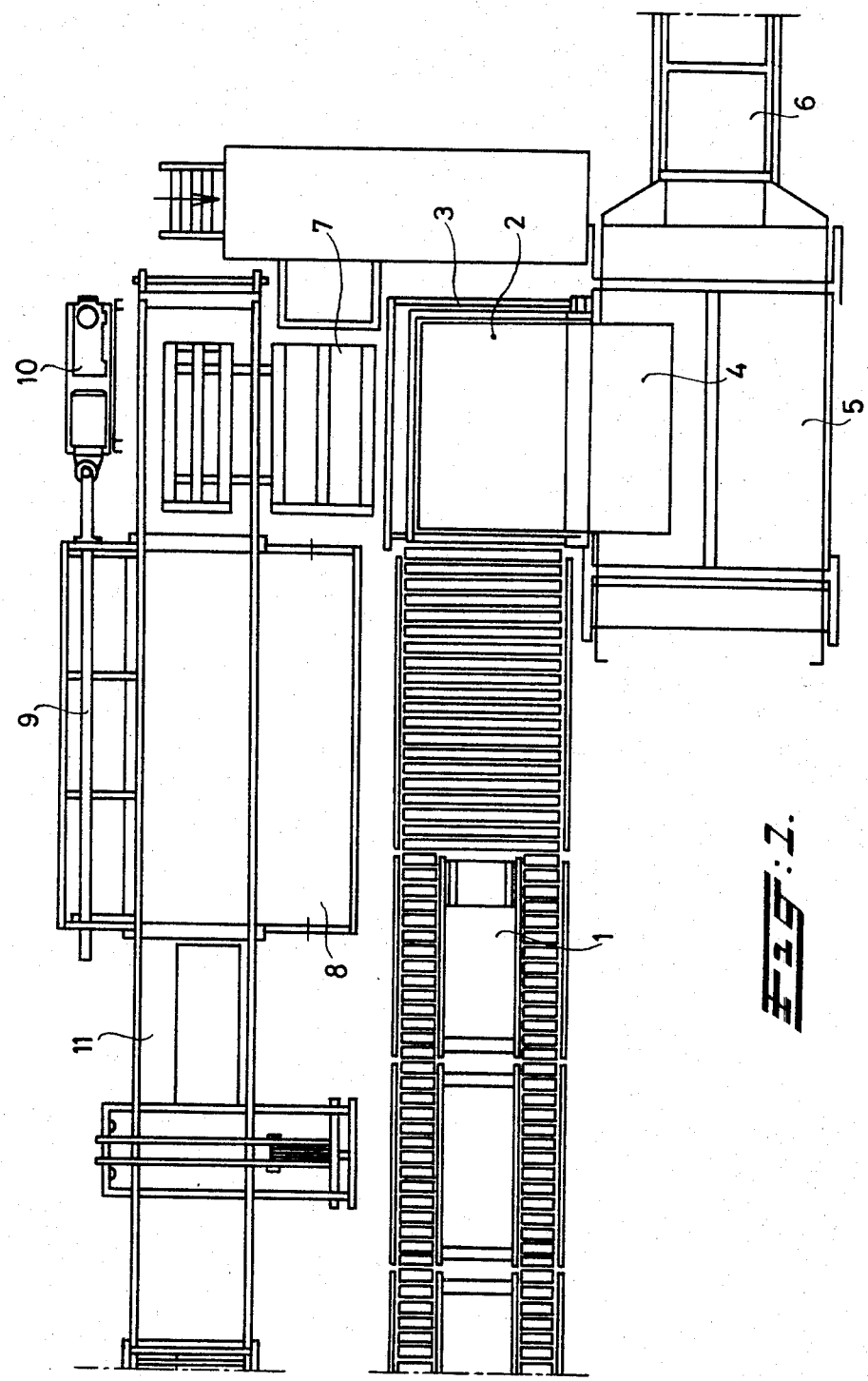

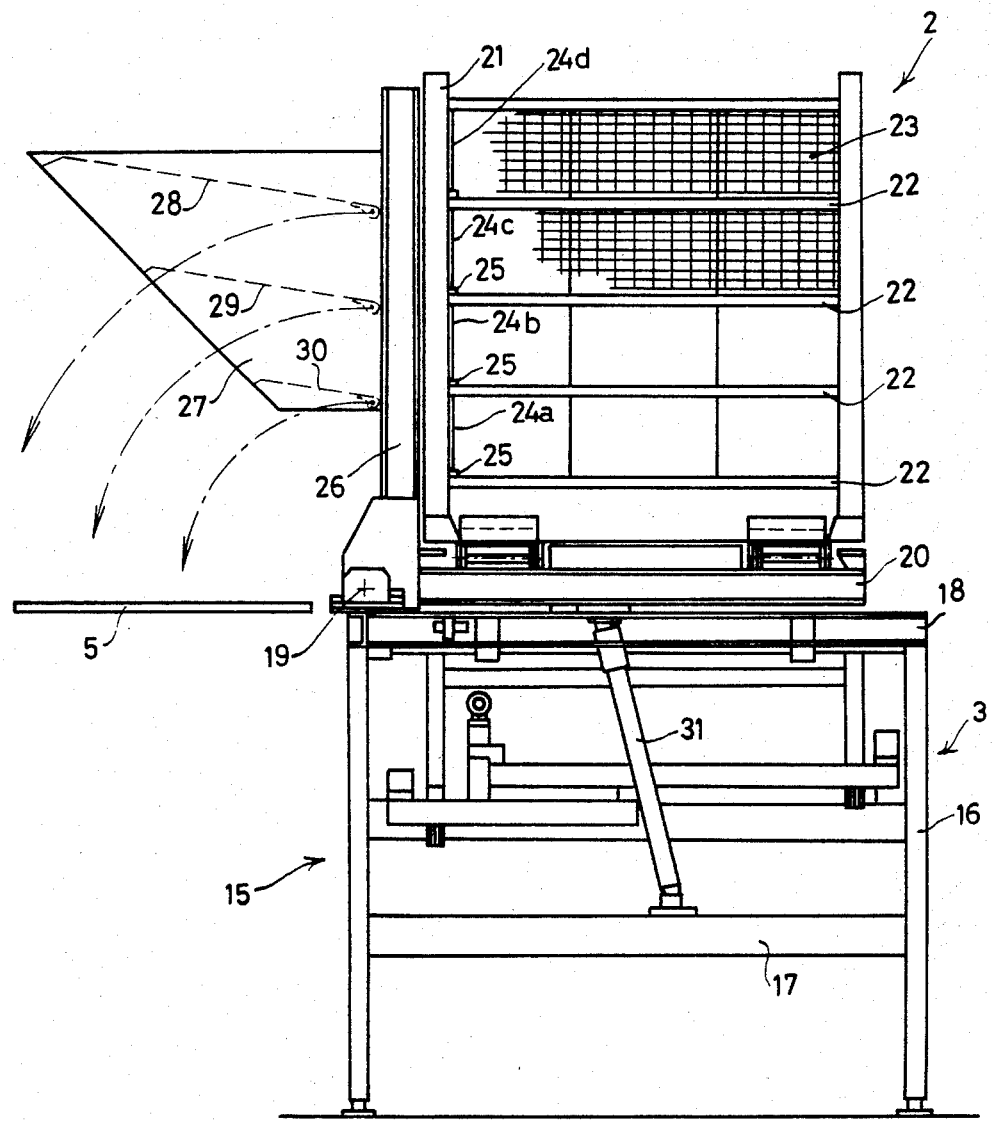
FIG:2.

DEVICE FOR EMPTYING A CONTAINER FILLED WITH LIVE POULTRY

My invention relates to a device for depositing live poultry on a receiving surface from a container consisting of a plurality of floors via guide surfaces adjoining the respective floors.

Such a device is known from the article: "An automated large-container system for transporting and unloading live poultry", published in Transactions of the American Society of Agricultural Engineering, vol. 25, no. 4, 1982.

This known device uses three, stationary, inclined guide surfaces of equal length; the end of the upper guide surface lies above an upper transporting belt and the respective ends of the two lower surfaces lie above a lower transporting belt. The poultry deposited on the upper belt then falls through a chute on the lower belt.

Practice has shown that with this known, relatively complicated, device no regular and controlled depositing of the birds can be realized; the birds, which fall in heaps upon each other, pick and thrash about and injure each other; such damaged birds are not suitable for further processing.

My invention aims to obviate these drawbacks and to provide a device by means of which the birds can be deposited on a single transport belt in a regular and controlled way.

According to my invention in such a device the guide surfaces are enclosed in a chute to adjoin the container and which is pivotable in a vertical plane, and furthermore have an increasing length as considered from the bottom to the top surface.

As a result of the greater length of the upper guide surface the birds present in the upper part of the container will be deposited further away on the receiving surface than the birds in the lower parts; by a suitable choice of the length of the guide surfaces a regular deposition of the birds over the greater surface and with a regular concentration is obtained.

Preferably the chute is connected to a container bearerframe so that the chute together with the container can be tilted in a vertical plane to deposit the birds.

DESCRIPTION OF THE DRAWINGS

FIG. 1 is a plan view of an installation in which the device according to the invention is used;

FIG. 2 is a side elevation and detail of one embodiment of the invention.

DESCRIPTION OF A PREFERRED EMBODIMENT

Part of an installation intended for unloading poultry supplied in containers is illustrated diagrammatically and in plan view in FIG. 1. The installation comprises a roller conveyor 1 on which the multi-layer containers filled with poultry are supplied; one such container is denoted by reference 2, and is shown resting on a frame 3 which will be described in greater detail with reference to FIG. 2. Frame 3 carries the chute according to the invention, denoted by reference 4. The birds delivered on the conveyor belt 5 via this chute are conveyed for further processing via belt 6.

The now empty containers arrive via the roller conveyor 7 to the washing cabin 8 where they are cleaned by means of a spraying device 9 coupled with the spray medium pump 10; they are carried off via discharge conveyor 11.

FIG. 2 shows a greater detail part 3 of the installation with the container 2 disposed thereon. This part 3 consists of a frame 15 with supporting legs 16, longitudinal members 17 and top members 18. The bearer frame 20 is secured thereto so as to hinge about point 19 and can pivot in the anticlockwise direction and back about the axis 19, driven by an actuator cylinder 31; suitable means (not shown) ensure that container 2 remains fixed on the frame. Each container consists in known manner of the corner members 21, floors 22 and mesh walls 23; four doors 24a, b, c and d are provided at the front. Each of the doors can pivot about a horizontal axis 25 into the open position shown in broken lines. The door locking members are not shown for the sake of clarity.

With the known apparatus, the birds are delivered on to the receiving surface, in this case the belt platform 5, by releasing the doors and tipping the containers. The disadvantage of this method is that the restless anxious birds injure one another as they peck and kick around.

According to my invention, the platform 20 bears an upright frame 26 on which is disposed the chute 4, consisting of the side walls 27 and the guide surfaces 28, 29, 30 disposed therebetween. The guide surfaces are so disposed as to connect with the three top doors 24d, 24c, 24b respectively; they are of different lengths, with the longest at the top.

On the pivoting of the containers with the chute into the shown position which, for the sake of clarity, is shown only partially and in broken lines in the drawing, the poultry will not be deposited on the receiving surface 5 packed in a group over one another as in the known device, but, in contrast thereto, over a large surface and divided up into a number of smaller groups.

What is claimed is:

1. A device for depositing live poultry onto a horizontal receiving surface comprising a container of live poultry having a plurality of vertically spaced horizontal floors and having hinged unloading doors adjacent to said floors at an unloading side of said container, means forming a pivotal support for the container whereby the container can be swung from a level poultry retaining position to a tilted poultry unloading position with relation to said receiving surface, and a poultry unloading chute connected with said means adjacent to said unloading side of the container and including poultry guide surface elements within the chute adjacent to the respective floors of the container, the guide surface elements being of progressively increasing lengths from the bottom to the top of said chute and constituting continuations of said floors, whereby tilting of the container with said chute and means will deposit poultry onto said receiving surface over substantially the entire width of the receiving surface and not in a single location thereon.

2. A device for depositing live poultry onto a horizontal receiving surface as defined in claim 1, and said means including a horizontal bearer frame for said container and a connected upright frame on the bearer frame adjacent to the unloading side of the container and attached to and bodily carrying said chute.

3. A device for depositing live poultry onto a horizontal receiving surface as defined in claim 1, and said chute including spaced vertical side walls between which said guide surface elements are disposed and having an inclined leading discharge end adapted to be positioned substantially horizontally above said receiving surface when the container and chute are in the tilted poultry unloading position.

4. A device for depositing live poultry onto a horizontal poultry conveyor comprising a multi-level container of live poultry having vertically spaced floors and having an unloading side, means forming a pivotal support for the container whereby the container can be moved from a level position to a tilted poultry unloading position above said conveyor, and an unloading chute connected with the container adjacent to said unloading side of the container and being bodily movable with the container between said level and tilted positions, said chute having internal poultry guide surface elements adjacent to said floors and effectively forming continuations of said floors and being of progressively increasing lengths from the bottom to the top of said chute, the chute also having an inclined discharge end adapted to be positioned near and above said horizontal poultry conveyor when the container and chute are in the tilted poultry unloading position.

* * * * *